United States Patent Office 3,214,450
Patented Oct. 26, 1965

3,214,450
HYDROXY, ALKOXY, ALUMINUM ACYLATES OF HIGHER FATTY ACIDS
Edwin B. Michaels, 76 Freemont Ave., Stamford, Conn., and Clayton A. Wetmore, 27 Rockmeadow Road, Norwalk, Conn.
No Drawing. Filed Oct. 4, 1962, Ser. No. 228,247
2 Claims. (Cl. 260—414)

This invention relates to novel aluminum compounds and to methods for their preparation. More particularly, it relates to organic aluminum compounds containing both ether and ester groups, and has for its object the utilization of such compounds in compositions that impart water repellency to fibers, filaments, yarns and fabrics of the natural and synthetic types.

As is known, organic aluminum compounds imparting water repellency to fabrics have been prepared. For instance, aluminum alcoholates have been reacted with one or two mols of an aliphatic monocarboxylic acid to form condensation products with the elimination of the alcohol. Unfortunately, the utilization of such condensates as water repellent compounds is not a universal practice because the desired residual effect on a fabric is not long lasting. The condensates tend to either decompose upon exposure to moistures and/or behave as gelling agents in most organic solvents.

It has been unexpectedly found that the above difficulties can be overcome by providing for a particular class of aluminum compounds represented by the general formula:

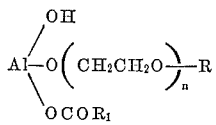

wherein R is an alkyl or an alkyl substituted phenyl radical, said alkyl containing from 6 to 18 carbon atoms, $n$ is an integer from 0 to 6, and $R_1$ is an aliphatic radical containing from 9 to 17 carbon atoms.

The aluminum hydroxylates of the present invention may be conveniently prepared as follows: An appropriate aluminum alcoholate is reacted with a substantially equimolar quantity of either an alkanol or an alkyl substituted phenol or its ethylene oxide condensation products as prepared by reacting 1 mol of the alkanol or the phenol with from 1 to 6 mols of ethylene oxide. The reaction is continued until 1 mol of an alcohol from the aluminum alcoholate reactant is removed. The latter reaction product is then reacted with one mol of an appropriate aliphatic monocarboxylic acid for a time sufficient to remove a second mol of the alcohol from the aluminum alcoholate. The order of reaction is not critical and the process can be conveniently carried out even in the presence of all the reactants. Finally, the so-prepared reaction product is then subjected to controlled hydrolysis by providing for the addition of 1 mol of water thereto and removing the third and last mol of alcohol from the aluminum alcoholate originally being treated.

Advantageously, a large variety of aluminum trialcoholates is contemplated herein. Among the preferred alcoholates are: aluminum ethylates, aluminum propylate, aluminum isopropylate, aluminum butylate, aluminum isobutylate, aluminum hexylate and mixtures of the same.

Illustrative alkanols, alkyl substituted phenols, alkanolethylene oxide condensates, and alkyl phenol-ethylene oxide condensates which react with the aluminum alcoholates are: methyl isobutyl carbinol, decanol, tridecanol, p-tert-octyl phenol, o-nonyl phenol, p-nonyl phenol, tridecylphenol, stearyl phenol and the ethylene oxide condensates thereof prepared by reacting from one to six mols of ethylene oxide per mol of the aforementioned phenol or alkanol.

As the aliphatic monocarboxylic acid reactant, there can be mentioned: decanoic acid, undecanoic acid, lauric acid, dodecanoic acid, tridecanoic acid, myristic acid, stearic acid, oleic acid and linoleic acid.

Advantageously, each of the aforementioned reactants is commercially available and the overall reaction can conveniently be carried out in the presence of an inert organic solvent. Exemplary solvents are, for instance, naphtha, perchloroethylene, or petroleum ether. The temperature of reaction can widely vary usually between 80° C. and 175° C. A good practice is to employ temperatures between 95° C. and 150° C. for optimum results.

The following examples will serve to more clearly illustrate the invention. These are merely illustrative and are intended not to be construed as being a limitation thereof. Unless otherwise stated, the parts given in this specification are by weight.

EXAMPLE 1

To a suitable reaction vessel equipped with stirrer, thermometer and condenser are added 204 parts of aluminum isopropylate (1 mol), 206 parts of tert-octyl phenol (1 mol) in 532.5 parts of petroleum ether solvent. The mixture is heated to a temperature of about 130° C. and the temperature is maintained until 60 parts of isopropanol (1 mol) is collected. Thereafter, 284.5 parts of stearic acid (1 mol) are slowly added with agitation. When 60 parts of isopropanol (1 mol) are additionally removed from the reaction mixture and collected, the reaction product is cooled to about 80° C. Thereafter, 18 parts of water (1 mol) are added thereto and heated to about 150° C. until 60 parts of isopropanol (1 mol) is removed and collected.

On evaporation of the petroleum solvent from the resultant mixture, 532.5 parts of hydroxylated aluminum p-tert-octyl phenoxide stearate is recovered. The latter product is solid—soft and waxy to the touch, amorphous and transparent and pale yellow in color. It is soluble in solvents such as benzene, petroleum ether and perchloroethylene.

EXAMPLE 2

The procedure of Example 1 is repeated in every detail except that aluminum ethylate (1 mol) is employed in place of aluminum isopropylate. During reaction a total of three mols of ethanol is collected and 527.5 of hydroxylated aluminum p-tert-octyl phenoxide stearate is obtained.

EXAMPLE 3

Repeating Example 1 above in every detail except that a condensate of one mol of p-tert-octyl phenol and 1.5 mols of ethylene oxide is employed in place of the p-tert-octyl phenol reactant of that example. The corresponding p-tert-octyl phenol-ethylene oxide condensate of hydroxylated aluminum stearate is obtained in good yield. The product is a waxy, soft, amorphous, light brown, transparent solid and is soluble in hydrocarbon solvents as toluene and petroleum ether.

EXAMPLE 4

Repeating Example 1 in every detail except that tridecanol is employed in place of p-tert-octyl phenol. Resultant mixture is then evaporated.

Upon evaporation of the solvent hydroxylated aluminum stearate tridecanoxide is formed in good yield. The product is a soft, waxy, transparent, amber colored solid soluble in hydrocarbon solvents, such as toluene or petroleum ether.

EXAMPLE 5

The procedure of Example 1 is repeated in all details except that p-nonyl phenol is substituted for the p-tert-octyl phenol reactant. Resultant product, upon evaporation of the petroleum ether solvent therefrom is hydroxylated aluminum stearate p-nonyl phenoxide. The latter compound recovered in good yield is soluble in organic solvents, such as petroleum ether and benzene. It is a soft, waxy, transparent, light yellow solid.

EXAMPLE 6

The procedure of Example 1 is repeated in every detail except that methyl isobutyl carbinol is substituted for p-tert-octyl phenol.

The hydroxylated aluminum stearate methyl isobutyl methoxide recovered in good yield upon evaporation of the petroleum solvent is soft, waxy, transparent solid, soluble in hydrocarbon solvents.

EXAMPLE 7

Repeating Example 1 in every detail except that oleic acid is substituted for stearic acid. Resultant hydroxylated aluminum oleate p-tert-octyl-phenoxide, is recovered in good yield upon evaporation of the petroleum ether solvent. It is a pale amber, soft, waxy, transparent solid, soluble in benzene or petroleum ether.

EXAMPLE 8

Substituting lauric acid for oleic acid in Example 7 above, there results hydroxylated aluminum laurate p-tert-octyl phenoxide, soluble in naphtha or perchloroethylene and is a soft, waxy, transparent solid.

Advantageously, the compounds of the invention can be utilized in a water repellent composition having markedly improved properties. Each of the compounds prepared in Examples 1-8 can be solubilized by dissolving, for instance, 1 to 10 parts of the same in 1000 parts of perchloroethylene, naphtha or any other equivalent solvent. A suitable wax, such as paraffin or beeswax, in an amount equal to 5 to 25 parts by weight and from 1 to 5 parts by weight of a wax compatible hardening resin such as limed rosin, polymerized terpene resin, or polymerized petroleum resin, are added to the solvent solution. However, the composition may be prepared by any order of addition of the components thereof.

The water-repellent compositions can be applied to a fabric by any presently known method as, for instance, by dipping, roll coating and the like. Pick up on the fabric from about 1% to about 15% by weight of the hydroxylated aluminum compounds of the invention, based on the weight of the fabric, is usually sufficient to coat or impregnate the fabric. Upon exposure to a heated atmosphere at temperatures ranging from about 30° F. to about 180° F., the treated fabric is freed from solvent. Advantageously, the fabric remains water repellent after repeated wear and exposure to normal rainfall. In addition, the fabric can be rendered water-repellent even though it had been previously laundered or drycleaned.

To further illustrate the efficacy of the compounds of the invention, the following examples are presented.

EXAMPLES 9–18

Three typical fabrics are subjected to treatment to effect their water repellency. Designated as No. 1 is a new unlaundered 6 oz. cotton twill fabric. Designated as No. 2 is a 6 oz. cotton twill fabric which had been drycleaned employing 4% detergent charged naphtha solvent. In the summary tabularized below, these fabrics are treated with a variety of compositions as defined therein.

The method employed in applying the water repellent compositions to fabrics involves the use of seven inch square swatches immersed in an appropriate treating bath. Each swatch is then removed from the solution bath and placed in a basket centrifuge. Extraction occurs and is terminated when the swatch increases to about one-third of its original weight. Extracted fabric is next dried in a circulating air-oven maintained at about 130° F. or higher. The test squares are ironed and tested by subjecting them for sixty seconds to standard spray tests of the American Association of Textile Chemists and Colorists (AATCC).

Referred to in the table herein below is a control solution whose composition is as follows:

Table 1

| Component: | Parts |
|---|---|
| Perchloroethylene (by vol.) | 1000 |
| Paraffin wax (M.P.=65° C.) | 20 |
| Terpene resin (M.P.=115° C.) | 12 |

A variety of commercial available equivalents for each of the above components can be used with equal advantage.

Table 2

| Ex. | Type of Treatment | Spray Ratings on Designated Fabrics | |
|---|---|---|---|
| | | No. 1 | No. 2 |
| 9 | Fabric untreated | 0 | 0 |
| 10 | Fabric treated with control composition | 70 | 50 |
| 11 | Fabric treated with control composition containing 1.5% of the product of Example 1. | 100 | 100 |
| 12 | Fabric treated with control composition containing 2% of the product of Example 2. | 100 | 100 |
| 13 | Same as 11 employing product of Example 4 | 100 | 90 |
| 14 | Fabric treated with control composition containing 2% of the compound prepared by Example 4. | 100 | 90 |
| 15 | Fabric treated with control composition containing 2% of the compounds prepared by Example 5. | 100 | 100 |
| 16 | Same as 14 except that 2% of the composition prepared by Example 6 is employed. | 100 | 90 |
| 17 | Fabric treated with control composition containing 2% of the compound prepared by Example 7. | 100 | 100 |
| 18 | Fabric treated with control composition containing 1% of the composition prepared by Example 8. | 100 | 90 |

In Examples 11 to 18 the AATCC spray ratings are substantially higher than the ratings for the treated fabric of Example 10. The higher the AATCC rating the more effective the treatment.

We claim:

1. A compound of the formula:

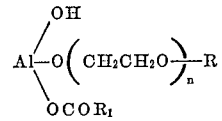

wherein R is a radical selected from the group consisting of alkyl and alkyl-substituted phenyl, said alkyl containing from 6 to 18 carbon atoms, $n$ is an integer from one to six and $R_1$ is an aliphatic hydrocarbon radical containing from 9 to 17 carbon atoms.

2. A compound according to claim 1 wherein R is p-nonyl phenyl, $n$ is 1.5 and $R_1$ is stearyl.

References Cited by the Examiner

UNITED STATES PATENTS

| 2,692,837 | 10/54 | Cross et al. | 117—135.5 |
| 2,892,780 | 6/59 | Rinse | 260—414 |
| 2,913,468 | 11/59 | Rinse | 260—414 |
| 2,932,659 | 4/60 | Orthner et al. | 260—414 |
| 3,030,274 | 4/62 | Grant | 167—90 |
| 3,057,748 | 10/62 | Staubly et al. | 117—66 |

CHARLES B. PARKER, *Primary Examiner.*

DANIEL D. HORWITZ, *Examiner.*